(12) United States Patent
Newman

(10) Patent No.: US 6,776,144 B1
(45) Date of Patent: Aug. 17, 2004

(54) FIVE STROKE INTERNAL COMBUSTION ENGINE

(76) Inventor: Lennox G. Newman, 16355 SW. 87 Pl., Miami, FL (US) 33157

(*) Notice: Subject to any disclaimer, the term of this patent is extended or adjusted under 35 U.S.C. 154(b) by 36 days.

(21) Appl. No.: 10/445,991

(22) Filed: May 28, 2003

(51) Int. Cl.$^7$ .............................................. F02M 31/00
(52) U.S. Cl. ...................................................... 123/540
(58) Field of Search ................ 123/540, 568.11–568.32

(56) References Cited

U.S. PATENT DOCUMENTS

| | | | | |
|---|---|---|---|---|
| 4,108,126 A | * | 8/1978 | Sanada et al. ............... | 123/540 |
| 4,289,097 A | | 9/1981 | Ward ........................... | 123/292 |
| 4,438,737 A | * | 3/1984 | Burandt ..................... | 123/90.17 |
| 4,996,953 A | * | 3/1991 | Buck ......................... | 123/51 A |
| 5,245,974 A | * | 9/1993 | Watson et al. .............. | 123/518 |
| 5,289,802 A | * | 3/1994 | Paquette et al. .......... | 123/18 A |
| 6,305,334 B1 | * | 10/2001 | Schuko ....................... | 123/56.2 |
| 6,446,618 B1 | * | 9/2002 | Hill ............................. | 123/698 |
| 6,553,977 B2 | * | 4/2003 | Schmitz ....................... | 123/561 |

* cited by examiner

*Primary Examiner*—Marguerite McMahon
(74) *Attorney, Agent, or Firm*—Albert Bordas; J. Sanchelima (57) ABSTRACT

A five-stroke internal combustion engine that improves fuel efficiency, power output, and decreases emissions. The five strokes are an intake stroke, a recycle stroke, a compression stroke, a power stroke, and the exhaust stroke. The five-stroke internal combustion engine provides for recycling some of the fuel-air mixture during the recycle stroke and provides a greater power stroke to compression stroke ratio. A condensed fuel-air separator for the fuel-air mixture and a recycle valve for that condensed fuel-air separator are part of the design. The instant invention may be utilized for gasoline, diesel and natural gas type engines.

8 Claims, 7 Drawing Sheets

FIVE STROKE INTERNAL COMBUSTION ENGINE

BACKGROUND OF THE INVENTION

1. Field of the Invention

The present invention relates to engines, and more particularly, to internal combustion engines having five strokes.

2. Description of the Related Art

Many designs for internal combustion engines have been designed in the past. None of them, however, include a five-stroke internal combustion engine that provides for recycling some of the fuel-air mixture during a recycle stroke, and provides a greater power stroke to compression stroke ratio. Recycling of the fuel-air mixture during the recycle stroke improves fuel efficiency, power output, and decreases emissions. The five strokes are an intake stroke, a recycle stroke, a compression stroke, a power stroke, and the exhaust stroke. A condensed fuel-air separator for the fuel-air mixture and a recycle valve for that condensed fuel-air separator are part of the design.

Of the numerous designs for reciprocating internal combustion engines, most of them comprise four stroke/cycle designs. These type of designs lose efficiency during their power stroke when a piston reaches bottom dead center and the exhaust valve is in an open position, thereby interrupting the energy being produced by the expanding gas. This causes usable unburned expanding gas to combust outside of the combustion chamber into the exhaust system.

Applicant believes that the closest reference corresponds to U.S. Pat. No. 4,289,097 issued to Ward for Six-cycle engine. However, it differs from the present invention because Ward teaches an improved six-cycle engine that improves performance in fuel economy and in the power to size ratio. The six cycles are a first intake stroke, a compression and storing stroke, second intake stroke, a compression and combining stroke, the power stroke, and the exhaust stroke. The invention provides for using some of the fuel's energy that ordinarily is lost in the engine's cooling system, by absorbing heat after the first stroke and subsequently using it in the power stroke. A special configuration of a separate chamber for the compression of gases induced in the first intake stroke and a special configuration for the valve to that chamber are part of the design. Two induction cycles are included in the six cycles for each power stroke.

Other patents describing the closest subject matter provide for a number of more or less complicated features that fail to solve the problem in an efficient and economical way. None of these patents suggest the novel features of the present invention.

SUMMARY OF THE INVENTION

A five-stroke internal combustion engine that improves fuel efficiency, power output, and decreases emissions. The five strokes are an intake stroke, a recycle stroke, a compression stroke, a power stroke, and the exhaust stroke. The five-stroke internal combustion engine provides for recycling a portion of the fuel-air mixture during the recycle stroke and provides a greater power stroke to compression stroke ratio. A condensed fuel-air separator for the fuel-air mixture and a recycle valve for that condensed fuel-air separator are part of the design. The instant invention may be utilized for diesel, gasoline and natural gas type engines.

The first cycle is the intake stroke. A primary intake of fuel-air mixture (gasoline model) or air only (diesel model) enters into a cylinder as the piston travels in a downward direction a full longitudinal piston stroke. In the preferred embodiment, we assume that a full longitudinal piston stroke is 8 inches. The valve configuration for the intake stroke commands that the intake valve is open and the exhaust and recycle valves be closed.

The second cycle is the recycle stroke. The piston travels in an upward direction a predetermined distance, which in the preferred embodiment, is approximately one-half of the full longitudinal piston stroke. During this stroke, some of the fuel-air mixture is forced through the open recycle valve into the condensed fuel-air separator. The valve configuration for the recycle stroke commands that the recycle valve be open and the intake and exhaust valves be closed.

The third cycle is the compression stroke. The remaining fuel-air mixture in the cylinder is compressed as the piston continues to travel in the upward direction to the position of top dead center. The valve configuration for the compression stroke commands that the recycle, intake and exhaust valves be closed.

The fourth cycle is the power stroke. Upon ignition (injection diesel model) of a spark plug, expanding gas drives the piston in a downward direction a full longitudinal piston stroke. The valve configuration for the power stroke commands that the recycle, intake and exhaust valves be closed.

The fifth cycle is the exhaust stroke. As the piston travels in the upward direction, burned gas is expelled through the opened exhaust valve port. The valve configuration for the exhaust stroke commands that the exhaust valve be open and the intake and recycle valves be closed.

The fuel-air mixture collected in the aforementioned condensed fuel-air separator is cooled and separated, with the liquid fuel being returned to a fuel tank. Remaining fuel-air vapor is then returned to the combustion chamber via the intake manifold for another attempt at combustion in the repeating cycles.

More specifically, the instant invention comprises a housing structure and cylinder means. The cylinder means are encased in the housing structure. The instant invention further comprises crankcase means. The crankcase means are affixed to the housing structure. The instant invention further comprises crankshaft means. The crankshaft means are positioned in the crankcase means. The instant invention further comprises a valve system means. The valve system means consists of an air intake valve, a recycle valve, and an exhaust valve. The valve system means is affixed to the housing structure. The instant invention further comprises a condensed fuel-air separator. The condensed fuel-air separator is located at a predetermined distance in close proximity to the cylinder means and located within the housing structure. The condensed fuel-air separator communicates with the cylinder means through a first elongated connector. The recycle valve is located within the cylinder means and is so arranged so as to periodically at predetermined times for predetermined periods allow a fuel-air mixture to flow from the cylinder means through the first elongated member to the condensed fuel-air separator, when the recycle valve is in an open position.

The five strokes are: an air intake stroke; a recycle stroke; a compression stroke; a power stroke; and an exhaust stroke. During the recycle stroke, a predetermined amount of the fuel-air mixture received during the intake stroke, is compressed into the condensed fuel-air separator. The condensed fuel-air separator comprises a reservoir where the fuel-air mixture accumulates and liquid fuel is returned to a fuel tank. Remaining fuel-air vapor within the condensed fuel-air separator is returned to the cylinder means via a second elongated connector for another attempt at combustion in the cylinder means.

The reservoir comprises a fuel level sensor system that monitors liquid fuel level, and further comprises a float that opens a valve when the liquid fuel level reaches a predetermined level. This allows accumulated liquid fuel to return to the fuel tank.

The instant invention has a greater power stroke to compression stroke ratio. The condensed fuel-air separator improves fuel efficiency, power output, and decreases emissions of the engine.

The instant invention further comprises a piston and piston rod. The piston and piston rod are assembled in the cylinder means. The piston rod is assembled to the crankshaft in the crankcase means. The instant invention further comprises a fuel injection system. The fuel injection system has a fuel injection inlet into the cylinder means.

It is therefore one of the main objects of the present invention to provide a five-stroke internal combustion engine that provides for recycling some of the fuel-air mixture during the recycle stroke.

It is another object of this invention to provide a five-stroke internal combustion engine that provides a greater power stroke to compression stroke ratio.

It is another object of this invention to provide a five-stroke internal combustion engine that includes variable recycle valve timing to optimize engine efficiency, wherein retarding or advancing the recycle valve timing varies both the compression ration and the recycle ration.

It is another object of this invention to provide a five-stroke internal combustion engine that provides a condensed fuel-air separator as a means to recycle unburned fuel, wherein the condensed fuel-air separator can be air cooled or liquid cooled.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
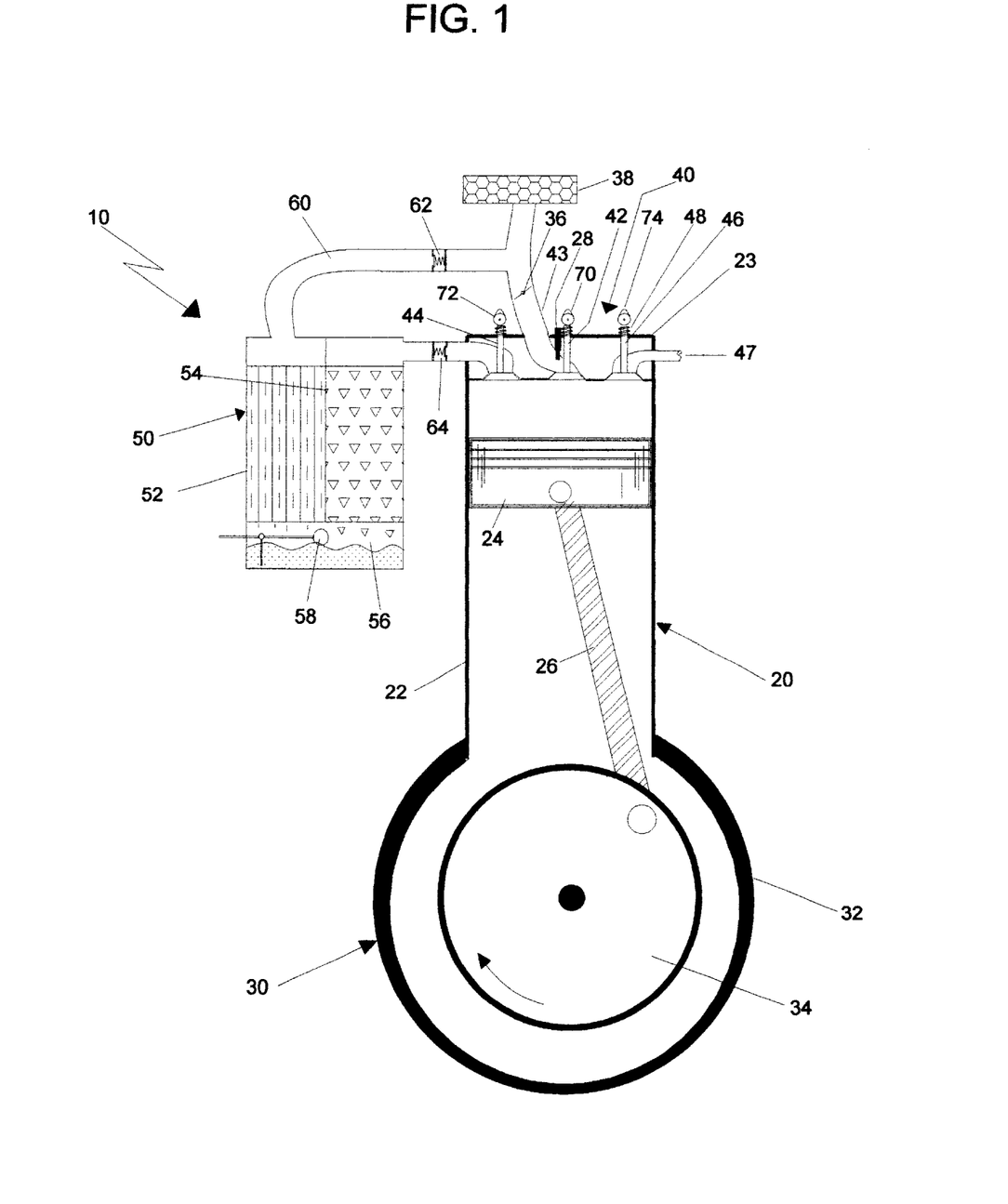
FIG. 1 is a vertical cross section through a crankshaft, piston, cylinder head, valve system and condenser fuel-air separator of a five-stroke engine.

Referring now to the drawings and particularly to FIG. 1, an improved five-stroke engine is shown at 10. It can be observed that it basically includes cylinder assembly 20, crankcase assembly 30, valve assembly 40, and condensed fuel-air separator 50.

The five-stroke engine may consist of one or more cylinders and associated mechanisms assembled with it as described in this invention. A typical cylinder and associated mechanisms of a five-stroke engine is portrayed in FIG. 1 as provided in this invention.

The engine structure consists of cylinder assembly 20, crankcase assembly 30, valve assembly 40, and condensed fuel-air separator 50. Only a portion of the cylinder assembly 20, crankcase assembly 30, valve assembly 40, and condensed fuel-air separator 50, is shown in order to describe the invention. This partial illustration is sufficient to describe the invention. However, it is to be understood that variation in these elements of structure to obtain the same operation is within the scope and intent of the invention.

Cylinder assembly 20 is constructed in a suitable housing means to which crankcase assembly 30 is attached, likewise a housing for valve assembly 40 is also attached to cylinder assembly 20 to enclose external portions of valve assembly 40. A typical piston 24, piston rod 26, and crankshaft 34 are illustrated assembled within cylinder 22 and crankcase 32. Assuming engine 10 is a gasoline model, an intake valve 42, spring 48, and intake valve cam 70 operate for the introduction of a fuel-air mixture into cylinder 22. Intake valve 42 is shown closed. When cycled to open, the intake valve 42 admits the introduction of air through the air intake port 43, seen in FIG. 2. An arrow indicates the direction of the flow of the air into the air intake port 43. At the precise predetermined and timed moment, fuel is injected into cylinder 22 through fuel injector 28.

A recycle valve 44, spring 48, and recycle valve cam 72 operates for the recycling of the fuel-air mixture from cylinder 22 into condensed fuel-air separator 50. Recycle valve 44 is shown closed. When cycled to open, the recycle valve 44 admits the introduction of unburned gas from cylinder 22 into condensed fuel-air separator 50 through the outtake port 45, seen in FIG. 3. An arrow indicates the direction of the flow of the fuel-air mixture through the outtake port 45. It is noted that variable recycle valve timing (retarding or advancing) will result in increased or decreased compression, conversely decreasing or increasing the volume of fuel recycled for optimum performance.

An exhaust valve 46, spring 48, and exhaust gas valve cam 74 operates for the elimination of burned gas from cylinder 22. Exhaust valve 46 is shown closed. When cycled to open, exhaust valve 46 permits the burned gas from the power stroke (described hereinafter) to be eliminated through the exhaust port 47. An arrow indicates the direction of the flow of the burned gas from exhaust port 47.

A special feature of the present invention is the specially configured condensed fuel-air separator 50, approximately adjacent to cylinder assembly 20. Housing 52 basically includes partition 54 and reservoir 56. The fuel-air mixture entering from outtake port 45 passes through one-way valve 64, on one side of housing 52, and to reservoir 56 where fuel-air separation is mainly completed. The fuel-air-mixture accumulates in reservoir 56 and liquid fuel is returned to the fuel tank through a return line, not seen. Float 58 controls the flow of liquid fuel to the fuel tank, not seen. The remaining fuel-air vapor within condensed fuel-air separator 50 is returned to cylinder assembly 20 via return pipe 60 for another attempt at combustion in the next set of cycles. Return pipe 60 has pressure regulator valve 62 to ensure adequate pressure.

It is to be noted that the valve cams may be of a variety of styles, and springs 48 normally keep valves 42, 44, and 46 closed, until cam actions by cams 70, 72, and 74 operate at proper cycle to open the valves which they serve. A fuel injector 28 is mounted at cylinder head 23 of cylinder 22. In addition, throttle plate 36 and air filter 38 may be of a variety of styles or as shown.

Referring now to FIG. 1 in conjunction with FIGS. 2 through 7 successively, the operation of the five-stroke engine of this invention will be described hereinafter.

Figure 2:
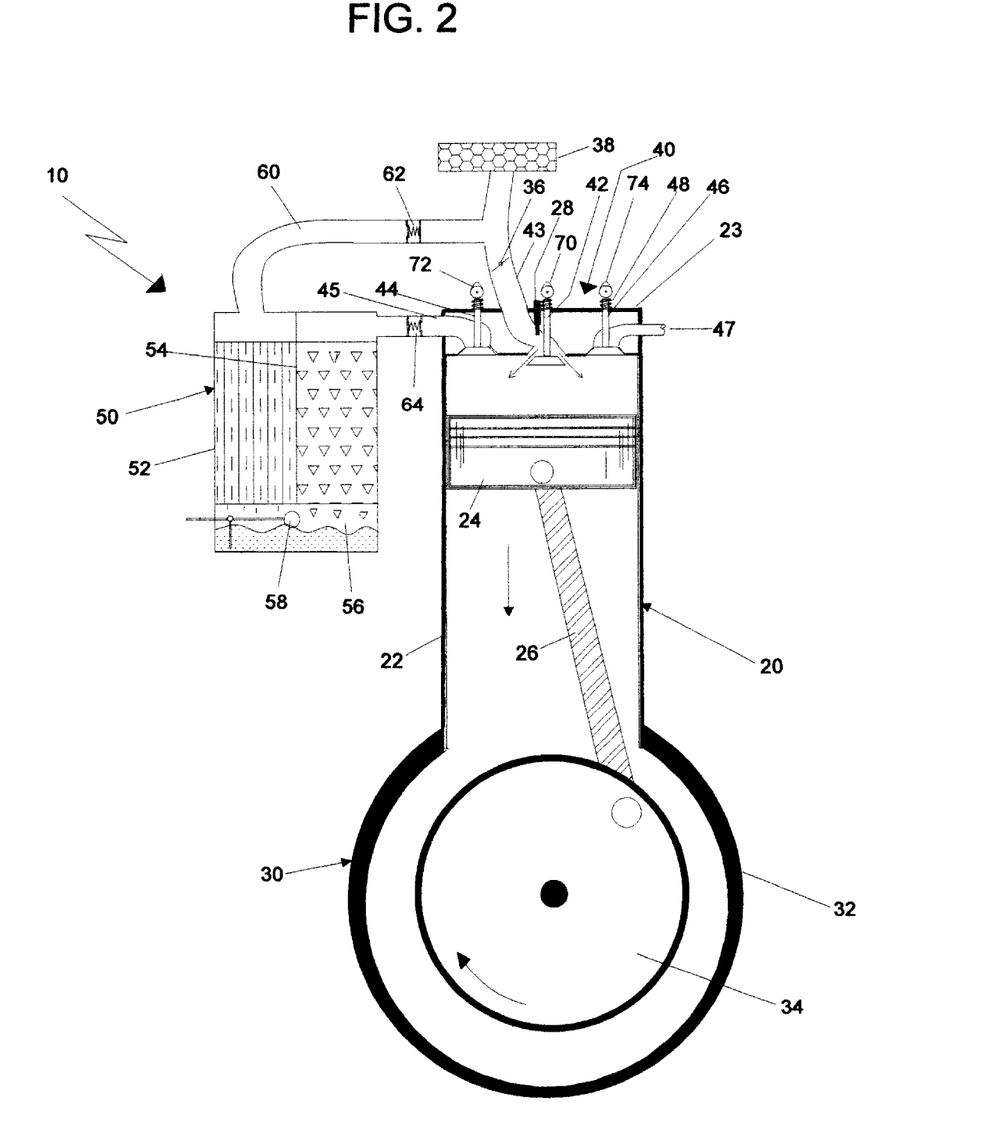
FIG. 2 is a schematic depiction of the crankshaft, piston, cylinder head, valve system and condenser fuel-air separator operation of the five-stroke engine on the intake stroke.

FIG. 2 illustrates piston 24 starting in a downward direction for the first intake stroke cycle to draw the fuel-air mixture into cylinder assembly 20. The valve configuration for the intake stroke commands that the intake valve 42 be open and the exhaust 46 and recycle 44 valves be closed. As piston 24 moves downward, air is drawn into the interior cavity of cylinder 22 until piston 24 reaches the bottom of its stroke for the completion of the first stroke. The direction of rotation of crankshaft 34 is shown in each of FIGS. 2 through 7. The air enters through intake port 43, as indicated by the arrow into cylinder 22. In the preferred embodiment, we assume that a full longitudinal piston stroke is 8 inches.

Figure 3:
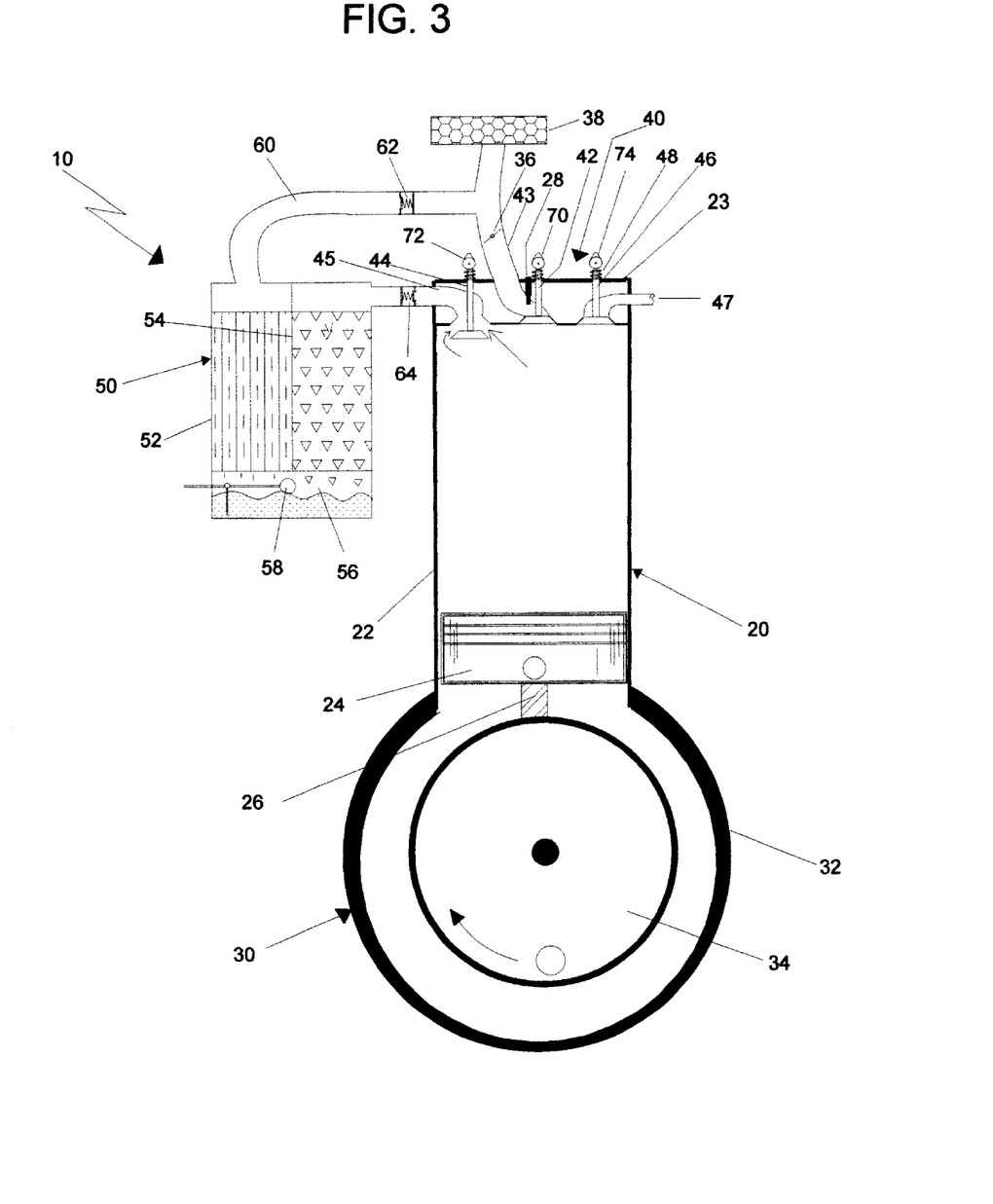
FIG. 3 is a schematic depiction of the crankshaft, piston, cylinder head, valve system and condenser fuel-air separator operation of the five-stroke engine on the recycle stroke.

As seen in FIG. 3, piston 24 is moving upward to recycle some of the fuel-air mixture in cylinder 22, which was drawn in on the first cycle. The valve configuration for the recycle stroke commands that recycle valve 44 be open and the intake 42 and exhaust 46 valves be closed. The piston travels in the upward direction a predetermined distance, which in the preferred embodiment, is approximately one-half of the full longitudinal piston stroke. The upward moving piston 24 compresses some of the aforementioned fuel-air mixture into condensed fuel-air separator 50, through the open recycle valve 44. At the same time, the intake 42 and exhaust 46 valves are closed to seal off the apertures around the intake 42 and exhaust 46 valves during the extra high pressure at this time. This stroke provides for recycling some of the fuel-air mixture and provides a greater power stroke to compression stroke ratio. Recycling of the fuel-air mixture during the recycle stroke improves fuel efficiency, power output, and decreases emissions over that possible in the prior art.

In the preferred embodiment, condensed fuel-air separator 50 further comprises two honey combed air-cooled heat exchangers connected together but separated by a partition 54, which may be defined as a baffle. And more specifically, float 58 is a fuel level sensor system that monitors the liquid fuel level. Float 58 opens a valve, not seen, when the liquid fuel level reaches a predetermined level, thereby allowing the accumulated liquid fuel to return to the fuel tank. In an alternate embodiment, the liquid fuel level may be controlled by a solenoid valve system.

Figure 4:
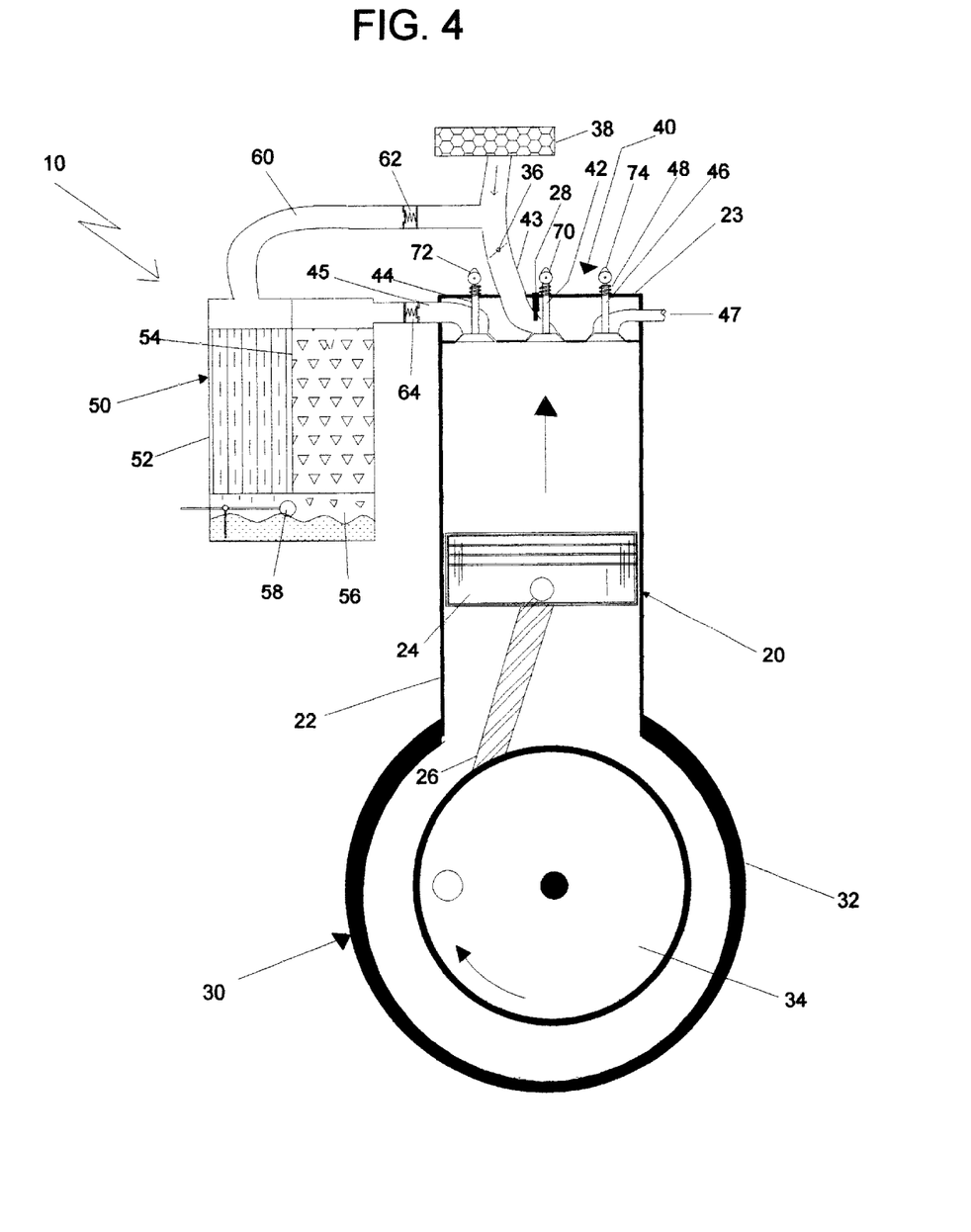
FIG. 4 is a schematic depiction of the crankshaft, piston, cylinder head, valve system and condenser fuel-air separator operation of the five-stroke engine on the compression stroke.

As seen in FIG. 4, piston 24 continues to travel in the upward direction to the position of top dead center. The valve configuration for the compression stroke commands that the recycle, intake and exhaust valves be closed. During this stroke, the remaining fuel-air mixture is then compressed as piston 24 continues traveling upwards.

Figure 5:
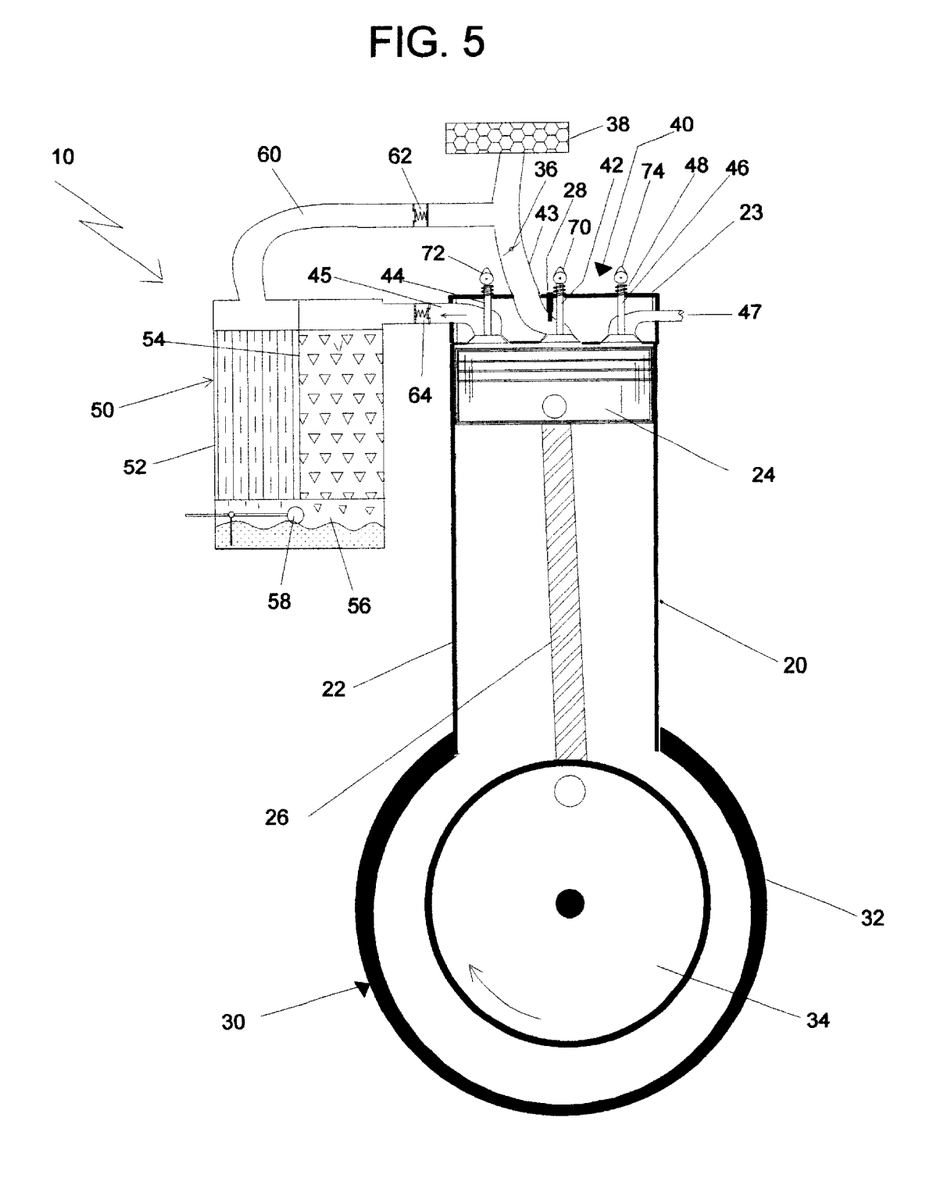
FIG. 5 is a schematic depiction of the crankshaft, piston, cylinder head, valve system and condenser fuel-air separator operation of the five-stroke engine on the power stroke at top dead center.

As seen in FIG. 5, piston 24 is at the position of top dead center to complete the compression stroke. The fuel-air mixture is now ready for ignition and the immediately following power stroke, seen in FIG. 6.

Figure 6:
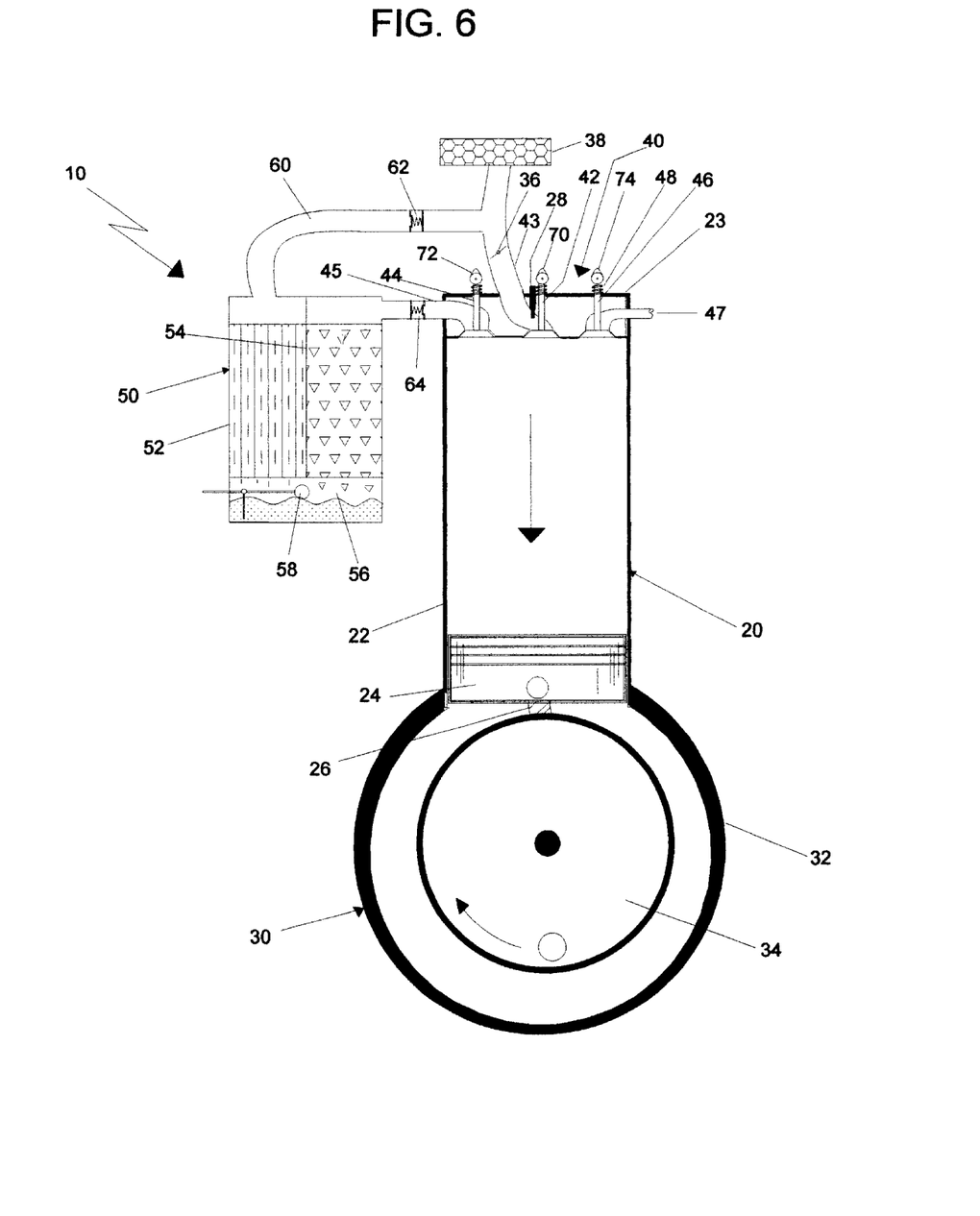
FIG. 6 is a schematic depiction of the crankshaft, piston, cylinder head, valve system and condenser fuel-air separator operation of the five-stroke engine on the power stroke at bottom dead center.

As the fuel-air mixture ignites, expanding gas drives piston 24 in a downward direction a full longitudinal piston stroke, as seen in FIG. 6. The valve configuration for the power stroke commands that the recycle, intake and exhaust valves be closed.

Figure 7:
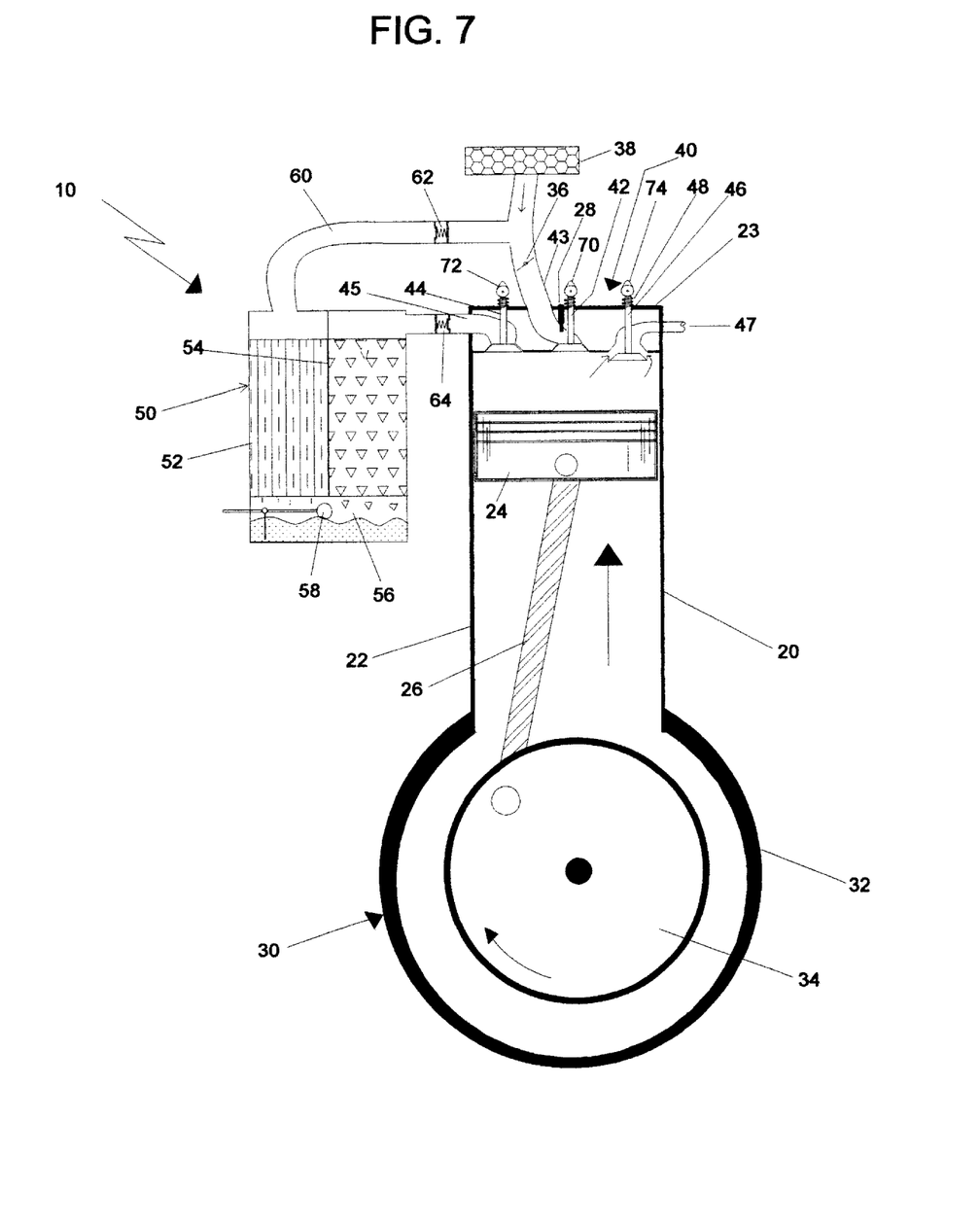
FIG. 7 is a schematic depiction of the crankshaft, piston, cylinder head, valve system and condenser fuel-air separator operation of the five-stroke engine on the exhaust stroke.

Seen in FIG. 7 is the fifth stroke. In the fifth or last stroke of the five-stroke engine 10, the burned gases are eliminated by the upward movement of piston 24 through exhaust valve 46, which is now open, and out through the exhaust port 47 as illustrated. The valve configuration for the exhaust stroke commands that the exhaust valve 46 be open and the intake 42 and recycle 44 valves be closed. In the continuous operation of this five-stroke engine, the intake stroke (FIG. 2) follows the exhaust stroke (FIG. 7).

Seen in Chart 1 below, is an illustration of the effect of variable recycle valve timing. Of particular interest, is the increase in efficiency and power by retarding and advancing the recycle valve timing.

EFFECT OF VARIABLE RECYCLE VALVE TIMING

This invention is suitable to be used with gasoline, diesel or compressed gas type fuel. Ignition can be accomplished with a spark plug, glow plug or the heat of compression in a traditional manner. Traditional components such as timing chains, gears etc. have not been depicted. It is understood that these components will be part of the final embodiment. The five-stroke internal combustion engine may consist of one or more cylinders and necessary mechanisms constructed of suitable materials as described in this invention. Only a portion of the mechanism means has been illustrated enough to describe the invention, it is to be understood that variation in these elements of structure to obtain the same results is within the scope of the invention.

As can be readily understood from the foregoing description of the invention, the present structure can be configured in different modes to provide the ability to construct a five-stroke engine. Accordingly, the foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A five stroke internal combustion engine, comprising;
   A) a housing structure;
   B) a cylinder means, said cylinder means being encased in said housing structure;
   C) a crankcase means, said crankcase means being affixed to said housing structure;
   D) a crankshaft means, said crankshaft means being positioned in said crankcase means;
   E) a valve system means, said valve system means consisting of an air intake valve, a recycle valve, and an exhaust valve, said valve system means being affixed to said housing structure; and
   F) a condensed fuel-air separator, said condensed fuel-air separator being located at a predetermined distance in close proximity to said cylinder means and located within said housing structure, said condensed fuel-air separator communicates with said cylinder means through a first elongated connector, said recycle valve being located within said cylinder means and being so arranged so as to periodically at predetermined times for predetermined periods allow a fuel-air mixture to flow from said cylinder means through said first elongated member to said condensed fuel-air separator when said recycle valve is in an open position.

2. The five stroke internal combustion engine according to claim 1, further characterized in that said five stroke are: an air intake stroke; a recycle stroke; a compression stroke;,a power stroke; and an exhaust stroke.

3. The five stroke internal combustion engine according to claim 2, further characterized in that during said recycle stroke, a predetermined amount of said fuel-air mixture received during said intake stroke is compressed into said condensed fuel-air separator, said condensed fuel-air separator comprising a reservoir where said fuel-air mixture accumulates and liquid fuel is returned to a fuel tank, remaining fuel-air vapor within said condensed fuel-air separator is returned to said cylinder means via a second elongated connector for another attempt at combustion in said cylinder means.

4. The five stroke internal combustion engine according to claim 3, further characterized in that said reservoir comprises a fuel level sensor system that monitors liquid fuel level, and further comprising a float that opens a valve when said liquid fuel level reaches a predetermined level, thereby allowing accumulated said liquid fuel to return to said fuel tank.

5. The five stroke internal combustion engine according to claim 4, further characterized in that said five stroke has a greater said power stroke to said compression stroke ratio.

6. The five stroke internal combustion engine according to claim 5, further characterized in that said condensed fuel-air separator improves fuel efficiency, power output, and decreases emissions of said engine.

7. The five stroke internal combustion engine according to claim 6, further comprising a piston and piston rod, said piston and piston rod being assembled in said cylinder means, said piston rod being assembled to said crankshaft in said crankcase means.

8. The five stroke internal combustion engine according to claim 7, further comprising a fuel injection system, said fuel injection system having a fuel injection inlet into said cylinder means.

* * * * *